Sept. 8, 1931.  C. L. SMITH ET AL  1,822,755

OIL FRACTIONATING APPARATUS

Filed May 13, 1930

Inventor
Clyde L. Smith
Cornelius B. Watson
By
Attorney

Patented Sept. 8, 1931

1,822,755

UNITED STATES PATENT OFFICE

CLYDE L. SMITH AND CORNELIUS B. WATSON, OF CHICAGO, ILLINOIS

OIL FRACTIONATING APPARATUS

Original application filed February 28, 1928, Serial No. 257,696. Divided and this application filed May 13, 1930. Serial No. 452,069.

This invention relates to an improved tray adapted for use in oil fractionating and separating equipment, as well as in other liquid and vapor or gas contacting apparatus.

It is an outstanding object of the present invention to provide a simple yet highly efficient tray which may be manufactured at a relatively low cost and which possesses extended heating surfaces to provide for efficient contact between, for example, heated oil vapors and a reflux liquid or condensate.

In accordance with the present invention, the tray comprises an elongated relatively narrow sheet metal body having the central portion thereof formed to provide a substantially shallow open-topped liquid-containing trough, the opposite longitudinal edges of the body terminating in integral depending vertical side walls which are spaced from the walls of the trough and lie beyond the confines thereof to permit ascending heated vapors to contact with the full lower area of the trough, and wherein said side walls are so disposed in relation to the upper longitudinal edges of the trough that over-flowing liquid passes in the form of vertically traveling films over the outer surfaces of said walls and collects in the form of droplets along the lower longitudinal edges of the outer walls and there intimately contacts with the heated vapors or gases.

This application consists of a true division of our prior application, Serial No. 257,696, filed February 28, 1928.

With these and other objects in view which will appear as the description proceeds, the invention consists in the novel features of construction, combinations of elements and arrangements of parts hereinafter to be fully described and pointed out in the appended claims.

Figure 1:
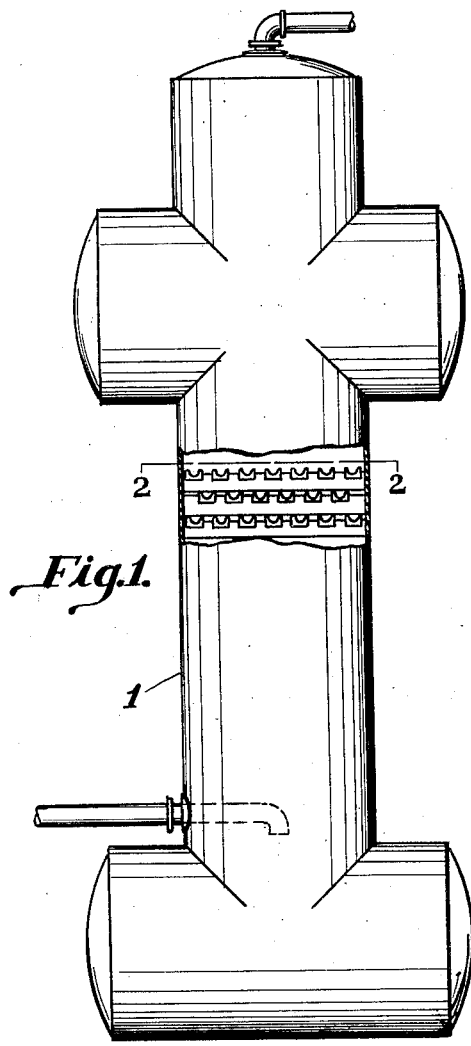
Figure 3:
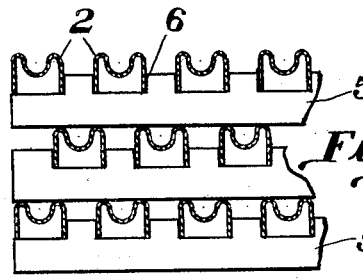
Figure 2:
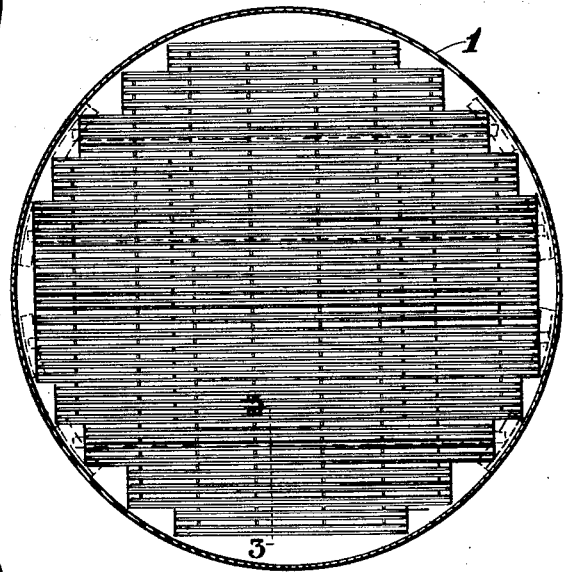
Figure 4:
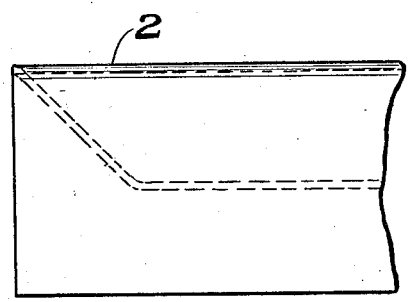
Figure 5:
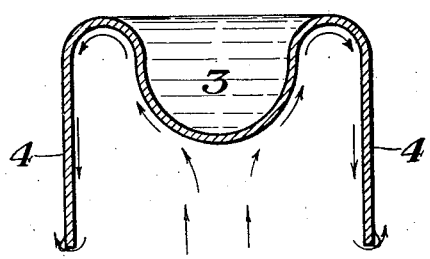

In said drawings:

Figure 1 is a vertical sectional view taken through a portion of a fractionating tower provided with trays formed in accordance with the present invention, Figure 2 is a horizontal section on the line 2—2 of Figure 1, Figure 3 is an enlarged vertical section on the line 3—3 of Figure 2, Figure 4 is an enlarged side elevation of an end of one of said trays, and Figure 5 is an enlarged vertical transverse sectional view taken through one of said trays.

Referring more particularly to the drawings, the numeral 1 designates the shell or casing of a fractionating tower of the type used particularly in the fractionation and separation of oils of varying boiling points. Heated oil vapors are introduced into the bottoms of such towers and pass upwardly. During the passage of the vapors in a generally upward direction the vapors are cooled to a desired temperature to effect the condensation of oil compounds of high boiling range. To insure this operation and effect a complete rejection of the high boiling oils from the vapors, the latter are caused during their passage through the tower to follow a circuitous course of travel and to come into intimate contact with the condensed or reflux liquids which pass by steps downwardly through the tower from their points of condensation. It is the purpose of the present invention to provide a novel and efficient form of tray or baffle which is positioned in a tower of the type described and which acts as a receiver for the descending reflux liquid to permit the latter to be thoroughly subjected to the heat of the ascending vapors for the purpose of removing to a maximum degree all low boiling oils from the reflux liquids. It will be understood that generally the low boiling oils possess a greater commercial value than the higher boiling oils and efficient fractionation to secure maximum liberation of such low boiling oils is highly desired and is secured with the apparatus herein disclosed.

To provide an efficient form of tray for use in such towers and at the same time one that can be manufactured with facility and economy, there is disclosed at 2 in the accompanying drawings a tray formed in accordance with the features of the invention.

This tray consists of a sheet metal body formed from a single blank. The body of the tray is of elongated construction longitudinally and relatively narrow transversely. In cross-sectional formation the finished tray is of substantially M-shaped design. In this respect the tray embodies a trough 3 having an open top and of relatively shallow construction so as to receive a pool or body of liquid oil. The longitudinal side edges of the trough terminate in depending, substantially vertically disposed supporting walls 4 which are arranged in laterally spaced relationship from the walls of the trough 3 and extend longitudinally of and parallel to said trough 3. The lower edges of the supporting walls 4 terminate in a horizontal plane below that of the lower portions of the trough 3 and this is done in order that the vapors passing upwardly through the tower, and after contacting with the full lower area of the trough 3, will be reversed in their direction of flow and caused to pass downwardly in order that such vapors may have extended contact with the walls 4 and the liquids supported or accumulated on the tray before the vapors continue in their generally upward flow through the tower. The ascending vapors contact with all portions of the bottom of the trough and the wall structure 4 does not interfere with this contact. In fact, due to pressure construction the walls 4 serve to retain the vapors for a definite period of time in contact with the trough so that efficient heat exchange takes place whereby the vapors are used to heat the cool liquid oil contained in the trough, enabling the lighter boiling constituents of this liquid oil to be released from the open top of the trough as vapors.

The troughs constantly refill themselves or maintain an over-flowing liquid content during the normal operation of the tower. The descending condensate or reflux passing through the tower in a downward direction encounters progressively increasing temperatures in its flow, collects in the troughs and, under properly regulated temperature conditions, this liquid over-flows the longitudinal side edges of the trough of each tray and passes downwardly in thin film formation over the vapor heated outer surfaces of the walls 4, by which operation the release of vapors of low boiling point is facilitated. The liquid oil which is not vaporized while running down the outer surfaces of the walls 4, accumulates as droplets on the lower longitudinal edges of the walls 4, and the vapors released from beneath the trough sweep through these droplets and by direct contact therewith provide for efficient heat interchange, and the consequent driving out of low boiling oils from the liquids. The liquids which drop by gravity from the lower edges of the walls 4 are received in the next lower row of horizontally placed trays, where the operation above given is repeated. This continues until the desired degree of fractionation has been secured whereby the light boiling point compounds pass overhead from the top of the tower as vapors and are separately condensed, treated and collected, whereas the higher boiling point oils collect in the bottom of the fractionating tower and are suitably removed.

To effect the support of the trays the interior of the tower is formed with a plurality of horizontally extending bars 5, which are notched as at 6. These notches are of sufficient width to receive the trays 2, which engage with the side walls of the notches and are restrained from moving laterally. The bars serve to effect the proper support of the trays in horizontal rows and to also stagger the trays of one row with respect to the trays of immediately adjacent rows. By this arrangement the ascending vapors are caused to pass through the winding tortuous passageways above noted when traveling through the tower and an efficient heat transfer arrangement of the trays is obtained thereby.

What is claimed is:

1. A tray for fractionating towers comprising an elongated relatively narrow sheet metal body formed from a single blank of material and having the central portion thereof formed to provide a longitudinally extending liquid-containing trough, the opposite longitudinal edges of said trough terminating in depending supporting walls which are spaced from the walls of said trough and lie beyond the confines thereof to permit ascending heated vapors to contact with the full lower area of said trough, said side walls being so disposed in relation to the upper longitudinal edges of said trough that liquid overflowing from the trough passes as a vertical traveling film over the outer surfaces of said walls.

2. A tray for fractionating towers comprising a relatively shallow longitudinally extending trough, and transversely spaced vertically extending supporting walls formed with and depending from the longitudinal edges of said trough, said supporting walls possessing a greater height than said trough whereby vapors passing upwardly contact with the full lower area of said trough and are retained in such contact by the open bottom chamber produced by the lower portions of said trough and said supporting walls.

3. A tray for fractionating towers comprising an elongated relatively narrow sheet metal body formed from a single blank of material and having the central portion thereof shaped to provide a longitudinally extending liquid-receiving trough substantially semicircular in cross section, the opposite longitudinal edges of said trough terminating in similarly curved inverted portions which terminate in depending substantially vertical supporting walls, said supporting walls being spaced from the curved walls of said trough and arranged laterally beyond the confines thereof to permit ascending heated vapors to contact with the full wall area of said trough and to trap the ascending vapors within the confines of the trough, causing said vapors to pass first upwardly into contact with the trough walls and then substantially downwardly along the inner surfaces of the supporting walls, the vapors being free from the confines of the trough by passing laterally across the lower edges of said supporting walls, said supporting walls being so disposed in relation to the upper longitudinal edges of said trough that liquid overflowing the trough passes in the form of vertically traveling films over the outer surfaces of said supporting walls.

In testimony whereof we affix our signatures.

CLYDE L. SMITH.
CORNELIUS B. WATSON.